United States Patent
Chung (10) Patent No.: US 12,084,019 B2
(45) Date of Patent: Sep. 10, 2024

(54) ELECTRONIC PARKING BRAKE SYSTEM AND METHOD FOR CONTROLLING CLAMPING FORCE THEREOF

(71) Applicant: HL MANDO CORPORATION, Pyeongtaek (KR)

(72) Inventor: Seokhwan Chung, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 354 days.

(21) Appl. No.: 17/745,910

(22) Filed: May 17, 2022

(65) Prior Publication Data

US 2022/0371568 A1  Nov. 24, 2022

(30) Foreign Application Priority Data

May 21, 2021  (KR) .......................... 10-2021-0065689

(51) Int. Cl.
| | | |
|---|---|---|
| *B60T 13/74* | (2006.01) | |
| *B60Q 9/00* | (2006.01) | |
| *B60T 17/22* | (2006.01) | |
| *F16D 65/18* | (2006.01) | |

(52) U.S. Cl.
CPC .............. *B60T 13/746* (2013.01); *B60Q 9/00* (2013.01); *B60T 17/22* (2013.01); *B60T 2220/04* (2013.01); *B60T 2240/00* (2013.01); *B60T 2250/00* (2013.01)

(58) Field of Classification Search
CPC ........ B60T 13/746; B60T 13/22; B60T 8/171; B60T 13/741; B60T 2220/04; B60T 2224/00; B60T 2250/00; B60Q 9/00; F16D 65/18; F16D 2121/24; F16D 2125/40
See application file for complete search history.

(56) References Cited

U.S. PATENT DOCUMENTS

| | | | |
|---|---|---|---|
| 10,399,553 B2* | 9/2019 | Kawai | B60T 8/885 |
| 10,962,071 B2* | 3/2021 | Chung | B60T 13/74 |
| 2018/0244255 A1* | 8/2018 | Kawai | B60T 13/746 |
| 2020/0166096 A1* | 5/2020 | Chung | B60T 13/741 |
| 2020/0369253 A1* | 11/2020 | Shah | B60T 8/1755 |

(Continued)

*Primary Examiner* — Thomas W Irvin
(74) *Attorney, Agent, or Firm* — Harvest IP Law, LLP (57) ABSTRACT

An electronic parking brake system includes an electronic parking brake (EPB) including a pair of brake pads disposed on both sides of a brake disc rotating with a rear wheel of a vehicle, a piston provided to press the pair of brake pads, a nut member provided to press the piston, a spindle member provided to move the nut member, and an electric motor configured to rotate the spindle member; a wheel speed sensor configured to detect a wheel speed of the rear wheel; a G sensor configured to detect a longitudinal acceleration of the vehicle; an accelerator pedal sensor configured to detect an operation of an accelerator pedal of the vehicle; an EPB switch configured to receive a parking apply command or a parking release command from a driver; and a controller configured to control the electric motor, wherein the controller is configured to determine whether a residual clamping force is present in the EPB based on a rear wheel speed or the longitudinal acceleration at a time of departure of the vehicle after parking is released, and when the residual clamping force is present, release the residual clamping force through an additional parking release control.

9 Claims, 9 Drawing Sheets

(56) References Cited

U.S. PATENT DOCUMENTS

| | | | |
|---|---|---|---|
| 2022/0073038 A1* | 3/2022 | Suzuki | F16D 65/18 |
| 2022/0371569 A1* | 11/2022 | Chung | B60T 13/746 |
| 2024/0140372 A1* | 5/2024 | Chang | B60T 13/741 |

* cited by examiner

ELECTRONIC PARKING BRAKE SYSTEM AND METHOD FOR CONTROLLING CLAMPING FORCE THEREOF

CROSS-REFERENCE TO RELATED APPLICATION

This application is based on and claims priority under 35 U.S.C. § 119 to Korean Patent Application No. 10-2021-0065689, filed on May 21, 2021 in the Korean Intellectual Property Office, the disclosure of which is incorporated herein by reference.

BACKGROUND

1. Technical Field

The disclosure relates to an electronic parking brake system and a method for controlling a clamping force thereof that may control an operation and release of an electronic parking brake.

2. Background Art

A Motor-on-Caliper-type electronic parking brake system increases a torque, generated from an electric motor of the electronic parking brake, through a reducer to generate a clamping force required for parking by a mechanical system inside a caliper.

When parking, the electronic parking brake system generates a clamping force by pressing brake pads to a brake disc, which rotates together with a vehicle wheel, by moving a piston forward by an electric motor of the electronic parking brake. Also, when parking is released, the generated clamping force is released by releasing the pressure of the brake pads from the brake disc by moving the piston backward by the electric motor.

In controlling a clamping force, the only control factor provided is a current signal. Using a principle that an output torque of an electric motor is proportional to a current, when a current value of the electric motor reaches an apply threshold value, it is determined that a required clamping force is satisfied, and when the current value of the electric motor reaches a release threshold value, it is determined that a clamping force is released, and the controlling ends.

Conventionally, even after a parking release control is completed, a residual clamping force may be present because brake pads may not completely release the pressure on a brake disc due to an error in a current sensor that detects a current of electric motor, a noise of current signal, or the like.

When a residual clamping force is present at the time of vehicle departure, a temperature of brake disc may increase, brake pads may be worn down, and the vehicle may not stably depart. Accordingly, a starting performance of the vehicle may be deteriorated and a fuel efficiency may be reduced.

SUMMARY

An aspect of the disclosure provides an electronic parking brake system and a method for controlling a clamping force thereof that may release a residual clamping force through an additional parking release control, when the residual clamping force is present at a time of vehicle departure.

Additional aspects of the disclosure will be set forth in part in the description which follows and, in part, will be obvious from the description, or may be learned by practice of the disclosure.

According to an aspect of the disclosure, there is provided an electronic parking brake system, including: an electronic parking brake (EPB) including a pair of brake pads disposed on both sides of a brake disc rotating with a rear wheel of a vehicle, a piston provided to press the pair of brake pads, a nut member provided to press the piston, a spindle member provided to move the nut member, and an electric motor configured to rotate the spindle member; a wheel speed sensor configured to detect a wheel speed of the rear wheel; a G sensor configured to detect a longitudinal acceleration of the vehicle; an accelerator pedal sensor configured to detect an operation of an accelerator pedal of the vehicle; an EPB switch configured to receive a parking apply command or a parking release command from a driver; and a controller configured to control the electric motor, wherein the controller is configured to determine whether a residual clamping force is present in the EPB based on a rear wheel speed or the longitudinal acceleration at a time of departure of the vehicle after parking is released, and when the residual clamping force is present, release the residual clamping force through an additional parking release control.

The controller is configured to determine that the residual clamping force is present in the EPB, when it is determined that the rear wheel speed is low in comparison with an amount of an accelerator pedal operation by the driver at the time of departure of the vehicle.

The controller is configured to determine that the residual clamping force is present in the EPB, when it is determined that a shake of the vehicle occurs from the longitudinal acceleration at the time of departure of the vehicle.

The controller is configured to perform the additional parking release control for a preset period of time.

The electronic parking brake system further includes a warning part configured to warn of presence of the residual clamping force, and wherein the controller is configured to warn the driver through the warning part, when the residual clamping force is present after the additional parking release control is performed.

According to another aspect of the disclosure, there is provided a method for controlling a clamping force of an electronic parking brake system configured to generate or release the clamping force in an EPB, the method including: determining whether a residual clamping force is present in the EPB based on a rear wheel speed or a longitudinal acceleration at a time of departure of a vehicle after parking is released; and when the residual clamping force is present, releasing the residual clamping force through an additional parking release control.

The determining of whether the residual clamping force is present includes detecting an amount of an accelerator pedal operation by a driver at the time of departure of the vehicle, and when it is determined that the rear wheel speed is low in comparison with the detected amount of the accelerator pedal operation, determining that the residual clamping force is present in the EPB.

The determining of whether the residual clamping force is present includes determining that the residual clamping force is present in the EPB, when it is determined that a shake of the vehicle occurs at the time of departure of the vehicle from the longitudinal acceleration.

The releasing of the residual clamping force includes performing the additional parking release control for a preset period of time.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Figure 1:
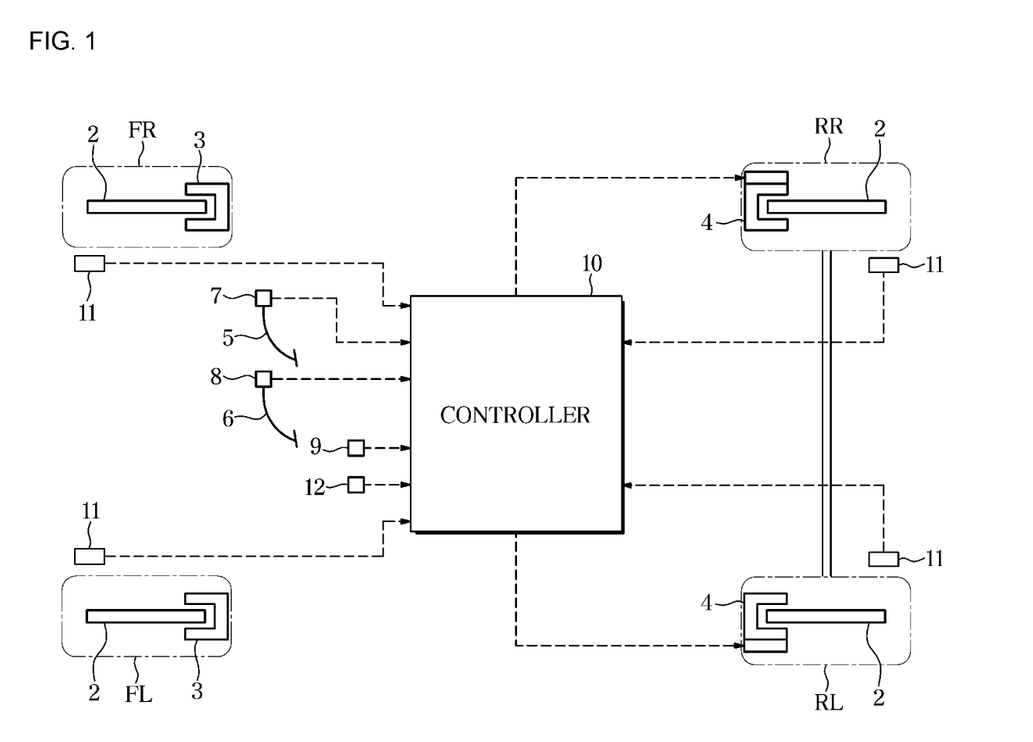
FIG. 1 illustrates a vehicle where an electronic parking brake system is applied according to an embodiment.

FIG. 1 illustrates a vehicle where an electronic parking brake system is applied according to an embodiment.

Referring to FIG. 1, left and right front wheels FL and FR and left and right rear wheels RL and RR are provided in a vehicle 1.

A brake disc 2 is provided in each of the wheels FL, FR, RL and RR.

The brake disc 2 of each of the left and right front wheels FL and FR may be provided with a braking power from a brake caliper 3 operated by hydraulic pressure.

The brake disc 2 of each of the left and right rear wheels RL and RR may be provided with a braking force by an electronic parking brake (EPB) 4.

A brake pedal 5 and an accelerator pedal 6 are provided in the vehicle 1. A brake pedal sensor 7 is provided in the brake pedal 5 to detect operation information for detecting a driver's braking intention. In this instance, the operation information includes information about whether the brake pedal 5 is operated and an operation amount of the brake pedal 5. An accelerator pedal sensor 8 is provided in the accelerator pedal 6 to detect operation information for detecting a driver's acceleration intention. Here, the operation information for detecting the driver's acceleration intention includes information about whether the accelerator pedal 6 is operated and an operation amount of the accelerator pedal 6.

The brake pedal sensor 7 transmits a detection signal corresponding to the detected operation information to a controller 10. The accelerator pedal sensor 8 transmits a detection signal corresponding to the detected operation information to the controller 10.

A G sensor 9 detects a longitudinal acceleration of the vehicle 1. The G sensor 9 transmits a detection signal corresponding to the longitudinal acceleration of the vehicle 1 to the controller 10.

A wheel speed sensor 11 detects a wheel speed of each of the wheels FL, FR, RL and RR. The wheel speed sensor 11 transmits a detection signal corresponding to each wheel speed to the controller 10.

An EPB switch 12 is a switch for receiving a driver's intention of operating the EPB 4. The EPB switch 12 may be provided around a driver's seat of the vehicle 1. The EPB switch 12 is provided to be turned on or off by the driver. When turned on, the EPB switch 12 transmits a signal corresponding to a parking apply command (apply command) to the controller 10, and when turned off, the EPB switch 12 transmits a signal corresponding to a parking release command (release command) to the controller 10.

Figure 2:
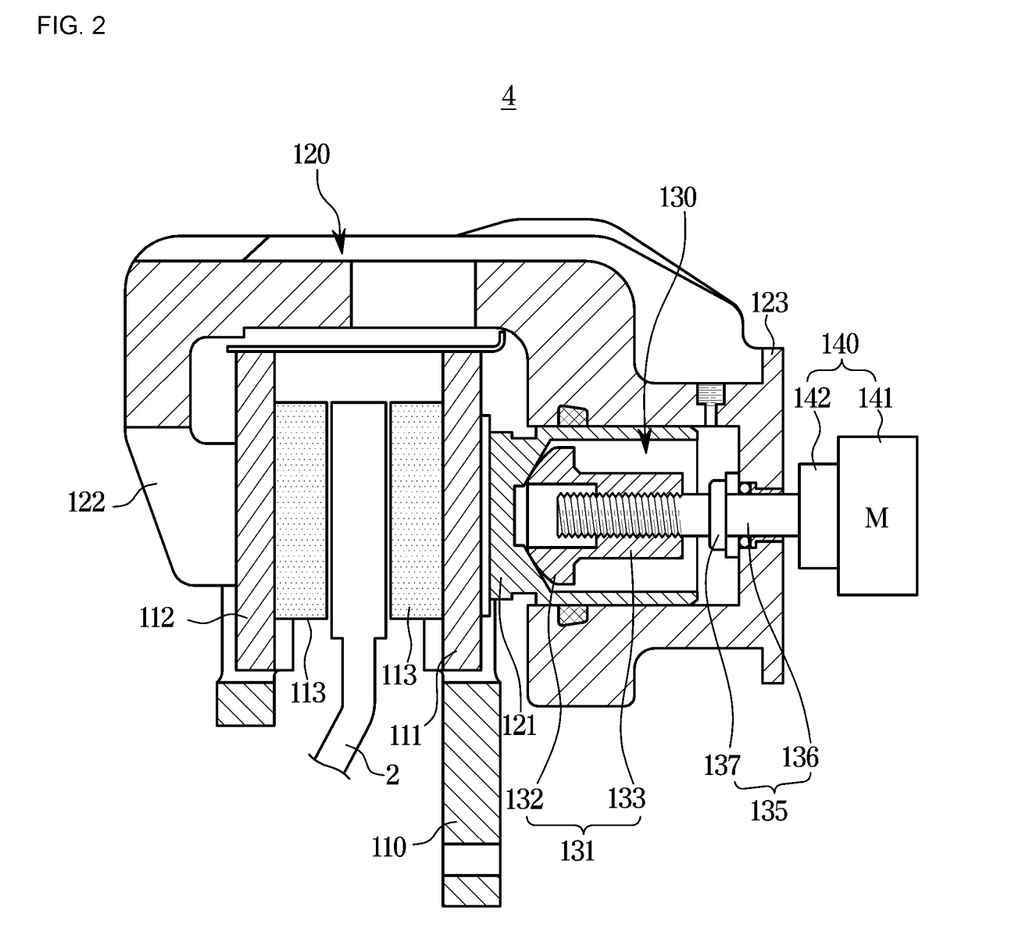
FIG. 2 illustrates an electronic parking brake applied to an electronic parking brake system according to an embodiment.

FIG. 2 illustrates an electronic parking brake applied to an electronic parking brake system according to an embodiment.

Referring to FIG. 2, the EPB 4 may include a carrier 110 on which a pair of pad plates 111 and 112 are installed movably in forward and backward directions to press the brake disc 2 that rotates with a wheel of a vehicle, a caliper housing 120 slidably installed on the carrier 110 and including a cylinder 123 in which a piston 121 is movably installed in forward and backward directions by braking hydraulic pressure, a power conversion unit 130 provided to press the piston 121, and a motor actuator 140 provided to deliver a rotational force to the power conversion unit 130 using a motor M.

The pair of pad plates 111 and 112 are divided into an inner pad plate 111 disposed to be in contact with the piston 121 and an outer pad plate 112 disposed to be in contact with a finger part 122 of the caliper housing 120. The pair of pad plates 111 and 112 are installed on the carrier 110 fixed to a vehicle body so that the pair of pad plates 111 and 112 may move toward both sides of the brake disc 2. Also, brake pads 113 are attached to one surface of each of the pair of pad plates 111 and 112 that face the brake disc 2.

The caliper housing 120 is slidably installed on the carrier 110. More specifically, the power conversion unit 130 is installed at a rear of the caliper housing 120, and the caliper housing 120 includes the cylinder 123 in which the piston 121 is movably installed in forward and backward directions and the finger part 122 bent in a lower direction to operate the outer pad plate 112. The finger part 122 and the cylinder 123 are integrally formed.

The piston 121 is provided in a cylindrical shape to have a u-shaped inside like a cup, and slidably inserted inside the cylinder 123. The piston 121 presses the inner pad plate 111 toward the brake disc 2 by an axial force of the power conversion unit 130 that receives the rotational force of the motor actuator 140. Accordingly, when the axial force of the power conversion unit 130 is applied, the piston 121 moves toward the inner pad plate 111, thereby pressing the inner pad plate 111. The caliper housing 120 operates in an opposite direction to the piston 121 by a reaction force, and thus the finger part 122 presses the outer pad plate 112 to the brake disc 2 side. Accordingly, braking may be performed.

The power conversion unit 130 may receive the rotational force from the motor actuator 140 and function to press the piston 121 to the inner pad plate 111 side.

The power conversion unit 130 may include a nut member 131, disposed inside the piston 121 to be in contact with the piston 121, and a spindle member 135 screwed to the nut member 131.

The nut member 131 is disposed inside the piston 121 in a state where rotation thereof is limited, and is screwed to the spindle member 135.

The nut member 131 may include a head portion 132 provided to be in contact with the piston 121, and an engagement portion 133 extending from the head portion 132 and in which a female screw thread is formed on an inner circumferential surface thereof in order to be screwed to the spindle member 135.

The nut member 131 moves forward or backward depending on a rotation direction of the spindle member 135, and may function to press the piston 121 or release the pressure on the piston 121. In this instance, the forward direction may be a movement direction in which the nut member 131 approaches the piston 121. The backward direction may be a movement direction in which the nut member 131 is away from the piston 121. In addition, the forward direction may be a movement direction in which the piston 121 approaches the brake pads 113. The backward direction may be a movement direction in which the piston 121 is away from the brake pads 113.

The spindle member 135 may include a shaft portion 136, which passes through a rear portion of the caliper housing 120 and rotates by receiving the rotational force of the motor actuator 140, and a flange portion 137 radially extending from the shaft portion 136. The shaft portion 136 may have one side which is rotatably installed and passes through a rear side of the cylinder 123, and the other side disposed inside the piston 121. In this instance, the one side of the shaft portion 136 that passes through the rear portion of the cylinder 123 is connected to an output shaft of a reducer 142 to receive the rotational force of the motor actuator 140.

The motor actuator 140 may include an electric motor 141 and the reducer 142.

The electric motor 141 moves the nut member 131 forward or backward by rotating the spindle member 135, thereby pressing the piston 121 or releasing the pressure on the piston 121.

The reducer 142 may be provided between an output side of the electric motor 141 and the spindle member 135.

Through the above configuration, when parking is performed, the EPB 4 may rotate the spindle member 135 in one direction using the motor actuator 140, thereby moving the nut member 131 and pressing the piston 121. The piston 121 pressed by the movement of the nut member 131 presses the inner pad plate 111, and thus the brake pads 113 come into close contact with the brake disc 2, thereby may generate a clamping force.

Also, when parking is released, the EPB 4 may rotate the spindle member 135 in an opposite direction using the motor actuator 140, thereby moving the nut member 131 pressed by the piston 121 backward. The pressure on the piston 121 may be released by the backward movement of the nut member 131. Due to the release of the pressure on the piston 121, the brake pads 113 may be spaced apart from the brake disc 2, thereby may release the generated clamping force.

Figure 3:
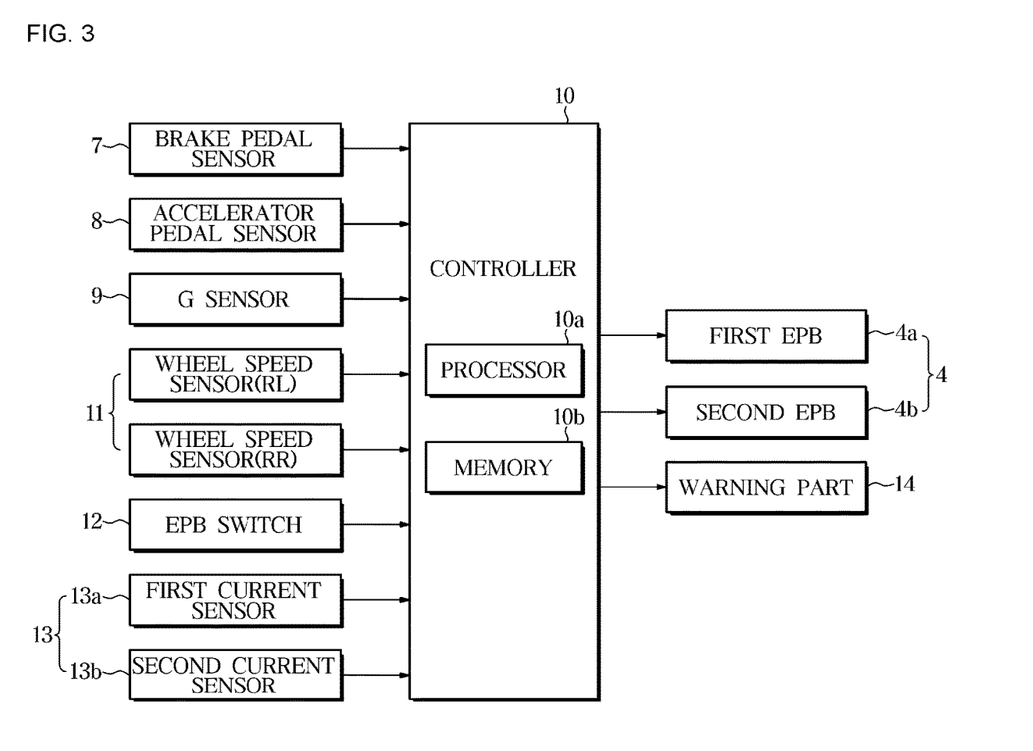
FIG. 3 illustrates a control block of an electronic parking brake system according to an embodiment.

FIG. 3 illustrates a control block of an electronic parking brake system according to an embodiment.

Referring to FIG. 3, the electronic parking brake system may include the controller 10 that performs overall control.

An input side of the controller 10 is electrically connected to the brake pedal sensor 7, the accelerator pedal sensor 8, the G sensor 9, a rear wheel-side wheel speed sensor 11, the EPB switch 12 and a current sensor 13.

An output side of the controller 10 is electrically connected to the EPB 4 and a warning part 14.

The EPB 4 may include a first EPB 4A and a second EPB 4B. The first EPB 4A may be provided in the left rear wheel RL and generate a clamping force required for parking of the left rear wheel RL according to a control signal of the controller 10. The second EPB 4B may be provided in the right rear wheel RR and generate a clamping force required for parking of the right rear wheel RR according to a control signal of the controller 10.

The current sensor 13 may include a first current sensor 13A and a second current sensor 13B. The first current sensor 13A may detect a current of an electric motor 141A of the first EPB 4A, and the second current sensor 13B may detect a current of an electric motor 141B of the second EPB 4B.

The controller 10 may be referred to as an electronic control unit (ECU).

The controller 10 may include a processor 10A and a memory 10B.

The memory 10B may store a program for processing or control of the processor 10A and various data for operating the electronic parking brake system.

The memory 10B may include a volatile memory such as a static random access memory (S-RAM) and dynamic random access memory (D-RAM), and a non-volatile memory such as a flash memory, a read only memory (ROM), an erasable programmable read only memory (EPROM), and the like.

The processor 10B may control overall operations of the electronic parking brake system.

The controller 10 may perform a parking apply mode or a parking release mode by an operation signal of the EPB switch 12 operated by a driver or an operation signal generated by a program related to an operation of the EPB.

In the parking apply mode, the controller 10 may rotate the electric motor 141 of the EPB 4 in one direction, thereby moving the nut member 131 forward and pressing the piston 121. Accordingly, a parking apply operation in which the brake pads 113 come into close contact with the brake disc 2 to generate a clamping force may be performed.

Figure 4:
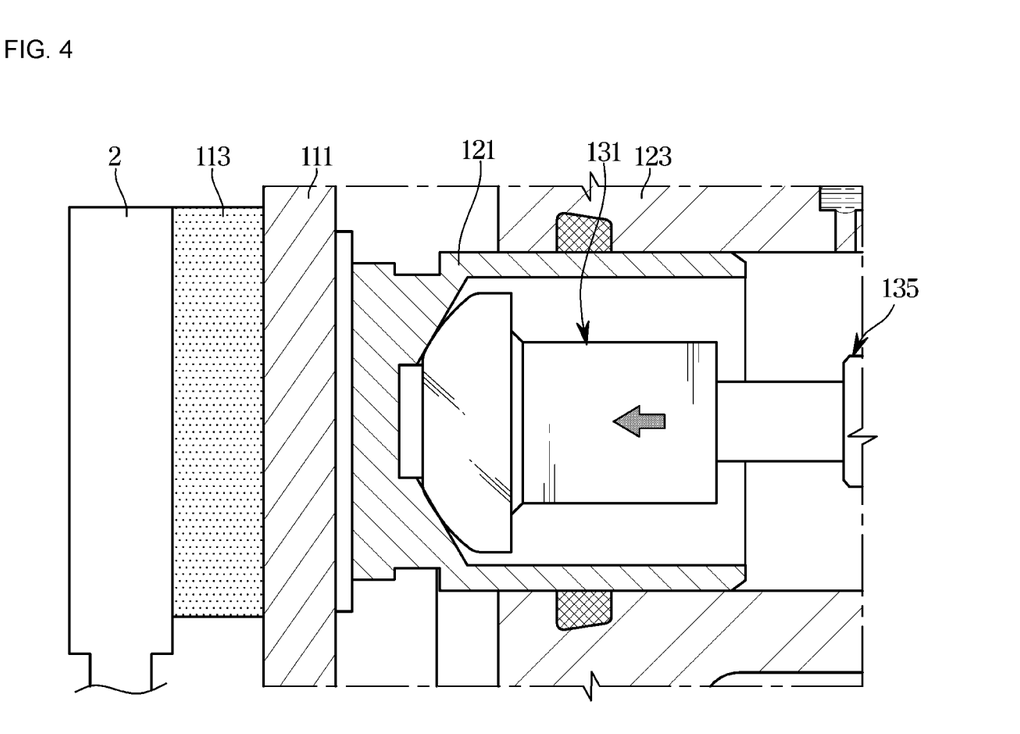
FIG. 4 illustrates a parking apply operation of an electronic parking brake system according to an embodiment.

FIG. 4 illustrates a parking apply operation of an electronic parking brake system according to an embodiment.

Referring to FIG. 4, in a parking apply mode, the controller 10 may move the nut member 131 forward by driving the electric motor 141.

The piston 121 is pressed by the forward movement of the nut member 131.

The inner pad plate 111 is moved toward the brake disc 2 by the pressure of the piston 121, and thus the brake pad 113 provided on the inner pad plate 111 presses the brake disc 2.

When the nut member 131 moves to a parking apply position, the controller 10 stops the electric motor 141 to hold the nut member 131 in the parking apply position.

The controller 10 determines whether a current position of the nut member 131 is the parking apply position based on a current value flowing through the electric motor 141 when the piston 121 is pressed by the movement of the nut member 131.

When the nut member 131 moves forward by the driving of the electric motor 141 while being spaced apart from the piston 121, a small amount of current flows through the electric motor 141. However, when the nut member 131 comes into contact with the piston 121 to press the piston 121, the amount of current flowing through the electric motor 141 is rapidly increased. As such, when the amount of current flowing through the electric motor 141 is greater than a preset value, it may be determined that the piston 121 is maximally pressed by the movement of the nut member 131. In this instance, a position of the nut member 131 may be the parking apply position.

Referring again to FIG. 3, in a parking release mode, the controller 10 rotates the electric motor 141 of the EPB 4 in an opposite direction to move the nut member 131 backward, thereby releasing the pressure on the piston 121. Accordingly, the controller 10 may perform a parking release operation for releasing the generated clamping force by spacing apart the brake pad 113 from the brake disc 2.

Figure 5:
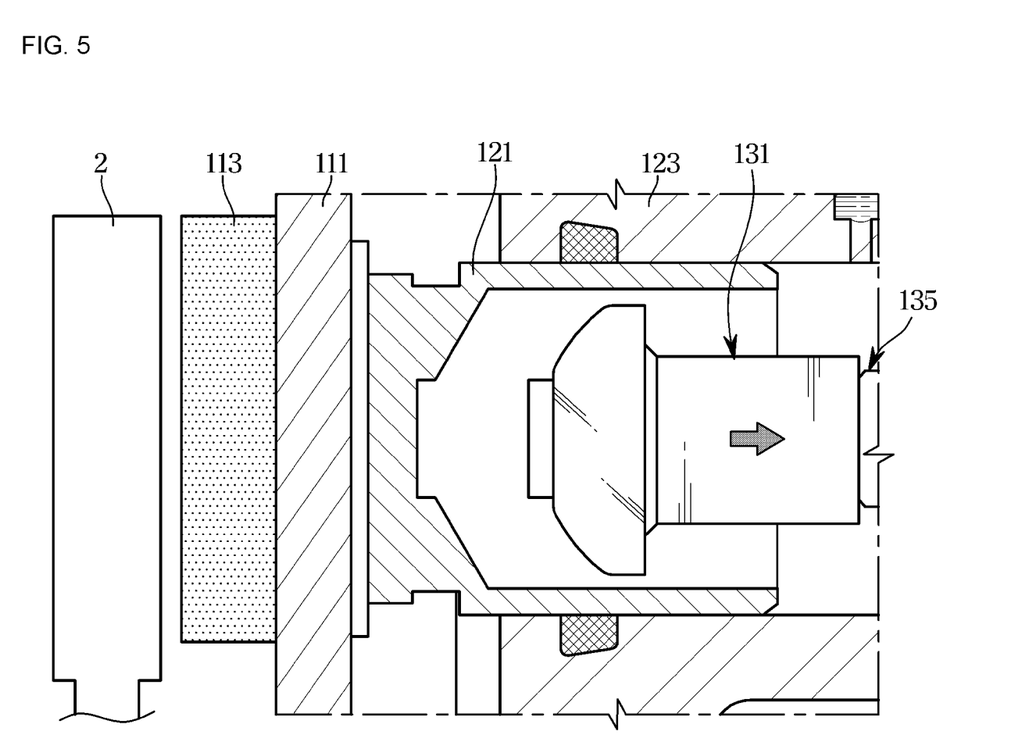
FIG. 5 illustrates a parking release operation of an electronic parking brake system according to an embodiment.

FIG. 5 illustrates a parking release operation of an electronic parking brake system according to an embodiment.

Referring to FIG. 5, the controller 10 moves the nut member 131 backward from a parking apply position to a parking release position.

The controller 10 moves the nut member 131 backward by driving the electric motor 141, and detects a current flowing through the electric motor 141 during the backward movement of the nut member 131. When the detected current value is greater than a preset value, the controller 10 may determine that the nut member 131 reaches the parking release position P3. When the nut member 131 that moves backward comes into close contact with the spindle member 135, the amount of current flowing through the electric motor 141 is drastically increased. Whether the nut member 131 reaches the parking release position may be determined using the above-described change in current. The parking release position may be a complete release position where the nut member 131 is maximally moved backward.

Figure 6:
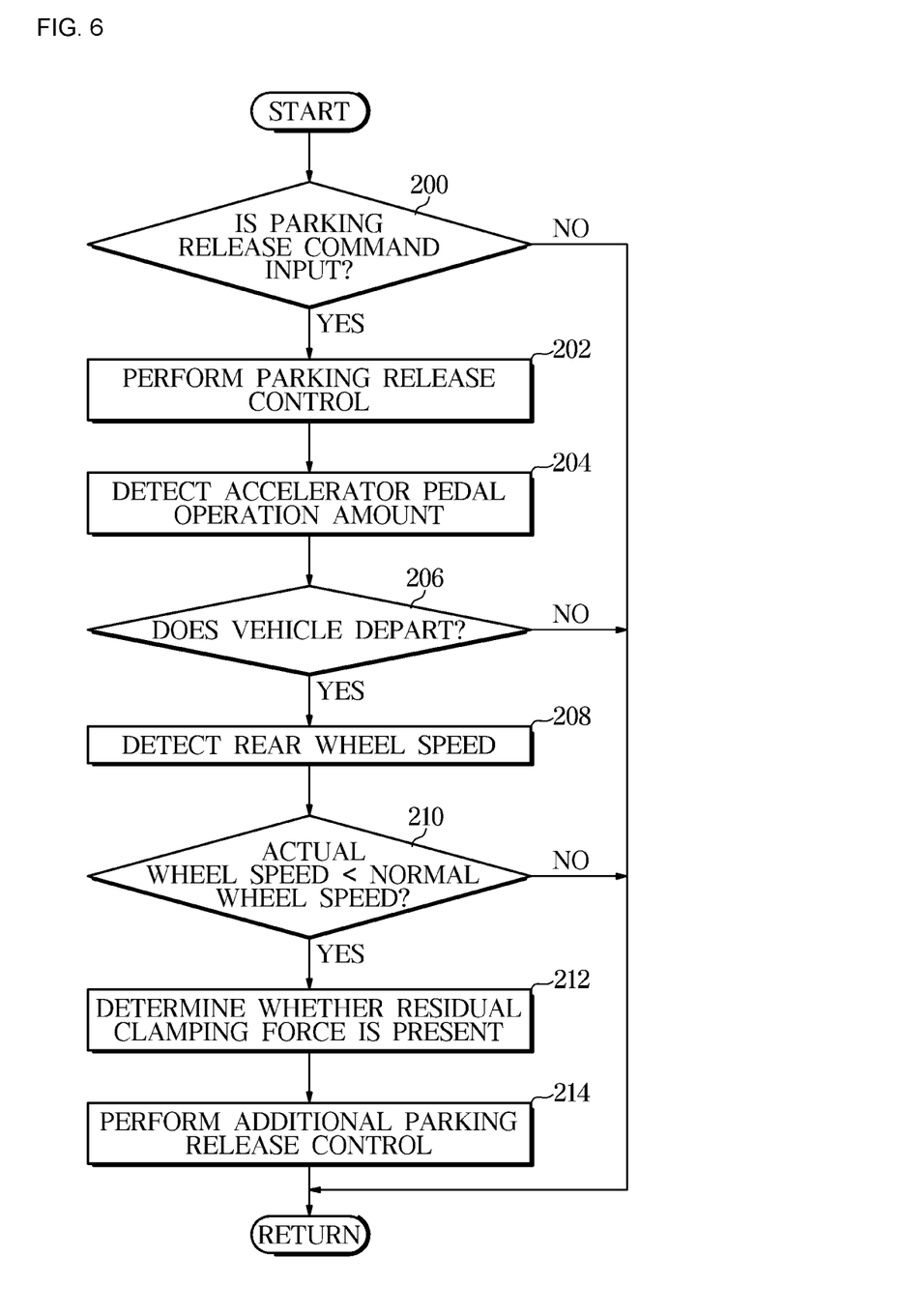
FIG. 6 illustrates a method for controlling a clamping force in an electronic parking brake system according to an embodiment.
Figure 7:
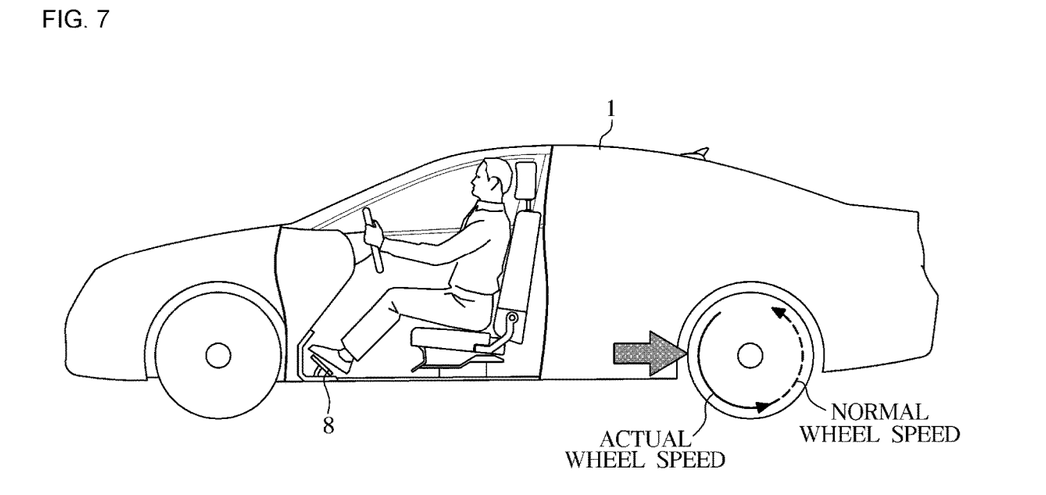
FIG. 7 illustrates determining presence of residual clamping force based on a rear wheel speed at a time of vehicle departure, in an electronic parking brake system according to an embodiment.

FIG. 6 illustrates a method for controlling a clamping force in an electronic parking brake system according to an embodiment. FIG. 7 illustrates determining presence of residual clamping force based on a rear wheel speed at a time of vehicle departure, in an electronic parking brake system according to an embodiment.

Referring to FIG. 6, a method for controlling a clamping force in an electronic parking brake system according to an embodiment may include determining whether a parking release command is input (200), performing a parking release control when the parking release command is input (202), detecting an operation amount of the accelerator pedal 6 after the parking release control is completed (204), determining whether a vehicle departs according to the detected operation amount (206), detecting a rear wheel speed at a time of vehicle departure (208), determining whether the detected actual rear wheel speed is lower than a normal wheel speed according to the detected accelerator pedal operation amount (210), determining that a residual clamping force is present in the EPB 4 when the detected actual rear wheel speed is lower than the normal wheel speed according to the detected accelerator pedal operation amount (212), and performing an additional parking release control for releasing the residual clamping force (214).

The controller 10 performs a parking apply control or parking release control with respect to the EPB 4 according to a parking apply command or the parking release command input from the EPB switch 12 in a stopped state.

The controller 10 may determine whether the vehicle departs according to the accelerator pedal operation amount detected by the accelerator pedal sensor 8 after the parking is released.

The controller 10 may determine whether a friction is present between the brake pads 113 and the brake disc 2 based on the wheel speed detected by the rear wheel-side wheel speed sensor 11 at the time of vehicle departure after the parking is released. The controller 10 may determine a driver's departure intention from the accelerator pedal operation amount detected by the accelerator pedal sensor 8. When an actual rear wheel speed at the time of vehicle departure is lower than a rear wheel speed (normal wheel speed) according to the driver's departure intention, the controller 10 may determine that the friction is present between the brake pads 113 and the brake disc 2. That is, the controller 10 may determine that a residual clamping force (refer to a thick arrow in FIG. 7) is present in the EPB 4, not fully released, even after the parking release control is completed (refer to FIG. 7).

When the residual clamping force is present in the EPB 4, the controller 10 may release the residual clamping force through the additional parking release control. In this instance, because the friction between the brake pads 113 and the brake disc 2 is significantly removed by the already performed parking release control, a degree of friction is relatively weak. Accordingly, the additional parking release control which is weaker than the previously performed parking release control may be performed. For example, by slightly moving the nut member 131 backward by rotating the electric motor 141 of the EPB 4 in an opposite direction only for a preset period of time, a pressure on the piston 121 may be additionally released.

When the residual clamping force is not released even after the additional parking release control is performed, the controller 10 may warn the driver of the presence of the residual clamping force through the warning part 14.

Figure 8:
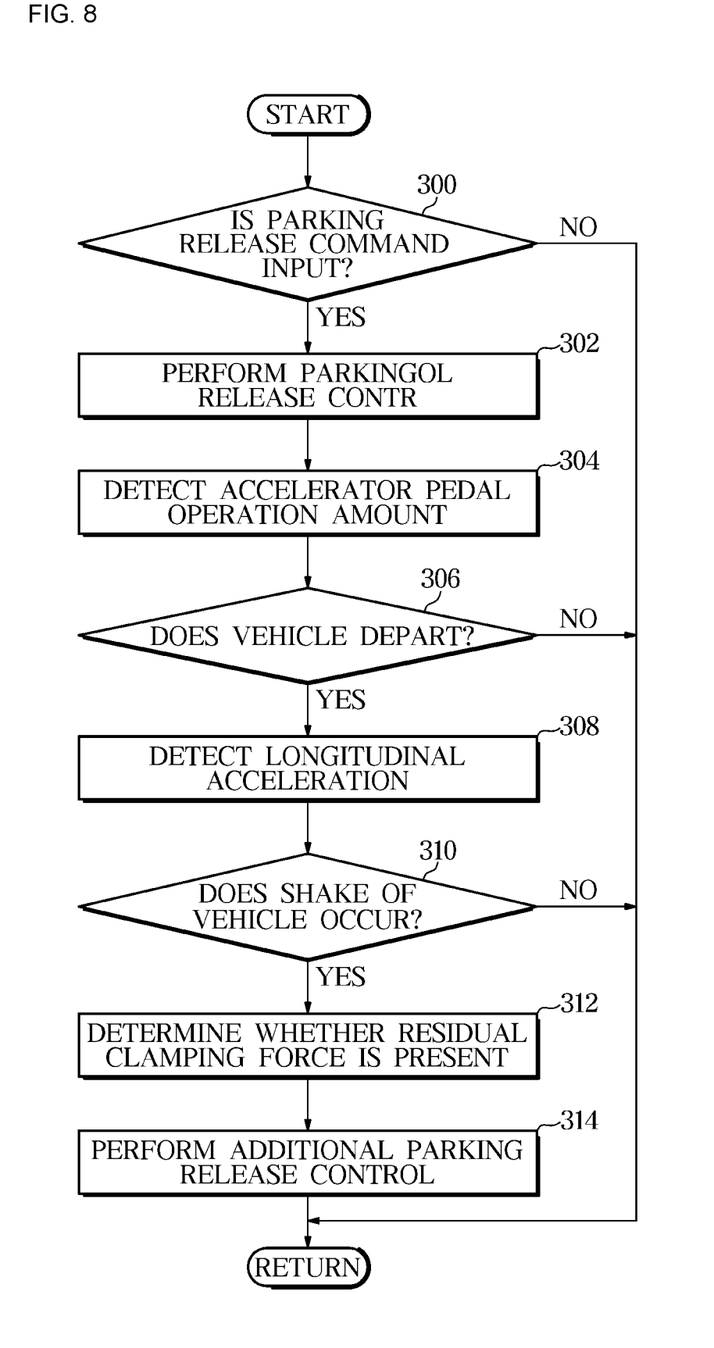
FIG. 8 illustrates a method for controlling a clamping force in an electronic parking brake system according to another embodiment.
Figure 9:
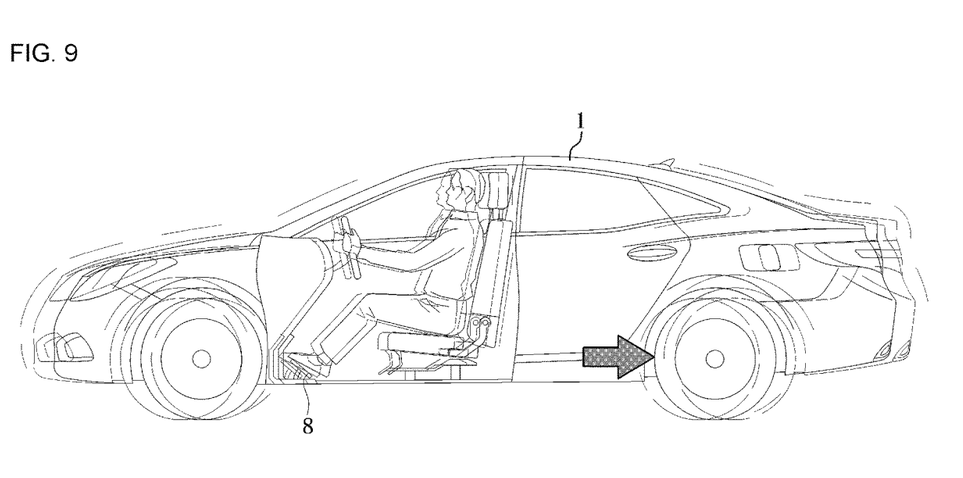
FIG. 9 illustrates determining presence of residual clamping force based on a longitudinal acceleration at a time of vehicle departure, in an electronic parking brake system according to another embodiment.

FIG. 8 illustrates a method for controlling a clamping force in an electronic parking brake system according to another embodiment. FIG. 9 illustrates determining presence of residual clamping force based on a longitudinal acceleration at a time of vehicle departure, in an electronic parking brake system according to another embodiment.

Referring to FIG. 8, a method for controlling a clamping force in an electronic parking brake system according to another embodiment may include determining whether a parking release command is input (300), performing a parking release control when the parking release command is input (302), detecting an operation amount of the accelerator pedal 6 after the parking release control is completed (304), determining whether a vehicle departs according to the detected accelerator pedal operation amount (306), detecting a longitudinal acceleration of the vehicle at a time of vehicle departure (308), determining whether a shake of the vehicle occurs from the detected longitudinal acceleration (310), determining that a residual clamping force is present in the EPB 4 when it is determined that the shake of the vehicle occurs (312), and performing an additional parking release control for releasing the residual clamping force (314).

The controller 10 may determine whether the shake of the vehicle occurs in forward or backward direction and/or up and down based on the longitudinal acceleration detected by the G sensor 9 at the time of vehicle departure after the parking is released. When the shake of the vehicle occurs, the controller 10 may determine that a friction is present between the brake pads 113 and the brake disc 2. That is, the controller 10 may determine that a residual clamping force (refer to a thick arrow in FIG. 9) is present in the EPB 4, not fully released, even after the parking release control is completed (refer to FIG. 9).

When the residual clamping force is present in the EPB 4, the controller 10 may release the residual clamping force through the additional parking release control.

When the residual clamping force is not released even after the additional parking release control is performed, the controller 10 may warn the driver of the presence of the residual clamping force through the warning part 14.

As is apparent from the above, according to the embodiments of the disclosure, when a residual clamping force is present at a time of vehicle departure, the electronic parking brake system and the method for controlling a clamping force thereof can release the residual clamping force through an additional parking release control, thereby can prevent unnecessary friction between brake pads and a brake disc, and improve a starting performance and fuel efficiency of vehicle.

Meanwhile, the aforementioned controller and/or its constituent components may include at least one processor/microprocessor(s) combined with a computer-readable recording medium storing a computer-readable code/algorithm/software. The processor/microprocessor(s) may execute the computer-readable code/algorithm/software stored in the computer-readable recording medium to perform the above-descried functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The disclosed embodiment may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SDD), a silicon disk drive (SDD), a read only memory (ROM), a compact disc read only memory (CD-ROM), a magnetic tape, a floppy disk, an optical recording medium, and the like.

What is claimed is:

1. An electronic parking brake system, comprising:
an electronic parking brake (EPB) comprising a pair of brake pads disposed on both sides of a brake disc rotating with a rear wheel of a vehicle, a piston provided to press the pair of brake pads, a nut member provided to press the piston, a spindle member provided to move the nut member, and an electric motor configured to rotate the spindle member;
a wheel speed sensor configured to detect a wheel speed of the rear wheel;
a G sensor configured to detect a longitudinal acceleration of the vehicle;
an accelerator pedal sensor configured to detect an operation of an accelerator pedal of the vehicle;
an EPB switch configured to receive a parking apply command or a parking release command from a driver; and
a controller configured to control the electric motor,
wherein the controller is configured to determine whether a residual clamping force is present in the EPB based on a rear wheel speed or the longitudinal acceleration at a time of departure of the vehicle after parking is released, and when the residual clamping force is present, release the residual clamping force through an additional parking release control.

2. The electronic parking brake system of claim 1, wherein the controller is configured to determine that the residual clamping force is present in the EPB, when it is determined that the rear wheel speed is low in comparison with an amount of an accelerator pedal operation by the driver at the time of departure of the vehicle.

3. The electronic parking brake system of claim 1, wherein the controller is configured to determine that the residual clamping force is present in the EPB, when it is determined that a shake of the vehicle occurs from the longitudinal acceleration at the time of departure of the vehicle.

4. The electronic parking brake system of claim 1, wherein the controller is configured to perform the additional parking release control for a preset period of time.

5. The electronic parking brake system of claim 1, further comprising:
a warning part configured to warn of presence of the residual clamping force, and
wherein the controller is configured to warn the driver through the warning part, when the residual clamping force is present after the additional parking release control is performed.

6. A method for controlling a clamping force of an electronic parking brake system configured to generate or release the clamping force in an EPB, the method comprising:
determining whether a residual clamping force is present in the EPB based on a rear wheel speed or a longitudinal acceleration at a time of departure of a vehicle after parking is released; and when the residual clamping force is present, releasing the residual clamping force through an additional parking release control.

7. The method of claim 6, wherein the determining of whether the residual clamping force is present comprises detecting an amount of an accelerator pedal operation by a driver at the time of departure of the vehicle, and when it is determined that the rear wheel speed is low in comparison with the detected amount of the accelerator pedal operation, determining that the residual clamping force is present in the EPB.

8. The method of claim 6, wherein the determining of whether the residual clamping force is present comprises determining that the residual clamping force is present in the EPB, when it is determined that a shake of the vehicle occurs at the time of departure of the vehicle from the longitudinal acceleration.

9. The method of claim 6, wherein the releasing of the residual clamping force comprises performing the additional parking release control for a preset period of time.

* * * * *